(12) United States Patent
Pan

(10) Patent No.: US 7,296,279 B2
(45) Date of Patent: Nov. 13, 2007

(54) TRANSMITTING DEVICE FOR FEEDING MECHANISM OF INFORMATION RECORDING/REPRODUCING APPARATUS

(75) Inventor: Guo-Chen Pan, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 412 days.

(21) Appl. No.: 11/020,938

(22) Filed: Dec. 23, 2004

(65) Prior Publication Data

US 2005/0174898 A1   Aug. 11, 2005

(30) Foreign Application Priority Data

Jul. 2, 2004   (CN)   .................... 2004 2 0071270

(51) Int. Cl.
*G11B 33/08* (2006.01)

(52) U.S. Cl. ..................................... 720/651

(58) Field of Classification Search ............. 720/663, 720/664, 676, 677, 679, 688, 651; 369/219

See application file for complete search history.

(56) References Cited

U.S. PATENT DOCUMENTS

| 6,052,358 | A  | * | 4/2000  | Morikawa et al. | 720/663 |
| 6,058,098 | A  | * | 5/2000  | Kato            | 720/663 |
| 6,356,526 | B1 | * | 3/2002  | Ito             | 720/688 |
| 6,445,673 | B2 |   | 9/2002  | Park            | 369/219 |
| 6,724,714 | B1 | * | 4/2004  | Kato et al.     | 720/672 |
| 6,829,776 | B2 | * | 12/2004 | Chen et al.     | 720/663 |
| 6,922,841 | B2 | * | 7/2005  | Lee et al.      | 720/677 |
| 2005/0034142 | A1 | * | 2/2005 | Park et al.     | 720/676 |

FOREIGN PATENT DOCUMENTS

| JP | EP-1058243 A1 | 12/2000 |
| JP | EP-1365407 A1 | 11/2003 |

* cited by examiner

*Primary Examiner*—Tianjie Chen
(74) *Attorney, Agent, or Firm*—Morris Manning Martin LLP; Tim Tingkang Xia, Esq.

(57) ABSTRACT

A transmitting device for a feeding mechanism of an information recording/reproducing apparatus includes an engaging member adapted to be engaged with a power source of the apparatus for power transmission, a fixing member adapted to be fixed to a pickup module of the apparatus, and a buffer member adapted to dampen shock due to collision. The buffer member includes at least two interconnecting portions which are deformable in a direction of movement of the pickup module, so shock due to sudden collision is effectively dampened.

15 Claims, 4 Drawing Sheets

TRANSMITTING DEVICE FOR FEEDING MECHANISM OF INFORMATION RECORDING/REPRODUCING APPARATUS

BACKGROUND OF THE INVENTION

1. Field of the Invention

The present invention relates to a mechanical transmitting device for a feeding mechanism of an information recording/reproducing apparatus, and particularly to a transmitting device which can effectively dampen shock of an optical pickup unit caused by accidental dropping or bumping.

2. Description of the Prior Art

In recent years, optical discs such as CDs (Compact Discs), DVDs (Digital Video Discs or Digital Versatile Discs) and MDs (Mini Discs) have been developed as large capacity, high-density media for recording a variety of information. It is very convenient to carry around such storage media.

An optical recording/reproducing apparatus can reproduce high-density information recorded on an optical disc, and can record information on an optical disc at a high density. An optical pickup unit of the optical recording/reproducing apparatus moves along radial directions of the optical disc to reproduce or record the information. Because a driving mechanism of the optical pickup unit is precisely designed, a base of the pickup unit seldom sustains accidental shock. Nevertheless, in practice, accidents involving the information recording/reproducing apparatus often happen. On certain of such occasions, for example when the information recording/reproducing apparatus is accidentally dropped to the ground, the optical pickup unit may bump against other parts of the optical recoding/reproducing apparatus and may even itself sustain damage.

Referring to FIG. 4, a typical information recording and reproducing apparatus 9 is shown. A pickup module 2 is movably fixed on a base 3, the pickup module 2 being movable along radial directions of a disc (not shown). The pickup module 2 is driven by a transmitting member 7 transmitting output power of a stepping motor (not labeled). The transmitting member 7 comprises an engaging portion 4 engaged with a feeding screw (not labeled) of the stepping motor, and a linking portion 5 engaged with the base 3. The feeding screw is located between two parallel bearing portions 6a, 6b fixed to a chassis 1. Two stopper projections 5a, 5b respectively extend outwardly from the linking portion 5 in directions parallel to the feeding screw. The stopper projections 5a, 5b are first to against the bearing portions 6a, 6b respectively, such that the base 3 with the pickup module 2 thereon is prevented from severely bumping against other parts of the information recording and reproducing apparatus 9. This kind of mechanism is disclosed in European Patent Application No. EP1058243A1.

However, when the ends of the stopper projections 5a, 5b come into contact with the bearing portions 6a, 6b, a great amount of shock may be transmitted to the pickup module 2 via the base 3. The precision mechanism of the pickup module 2 is liable to sustain damage that causes malfunction or even complete failure.

SUMMARY OF THE INVENTION

Accordingly, an object of the present invention is to provide a simple transmitting device for a feeding mechanism of an information recording/reproducing apparatus, wherein the transmitting device has good buffering against shock.

In order to achieve the object set out above, a transmitting device for feeding mechanism of information recording/reproducing apparatus of the present invention comprises an engaging member adapted to be engaged with a power source of the apparatus for power transmission, a fixing member adapted to be fixed to a pickup module of the apparatus, and a buffer member adapted to dampen shock due to collision. The buffer member comprises at least two interconnecting portions which are deformable in a direction of movement of the pickup module. Because the buffer member is deformable in the direction of movement of the pickup module, shock due to sudden collision is effectively dampened.

BRIEF DESCRIPTION OF THE DRAWINGS

Other objects, advantages and novel features of the present invention will become more apparent from the following detailed description when taken in conjunction with the accompanying drawings, in which.

DETAILED DESCRIPTION OF THE INVENTION

Figure 1:
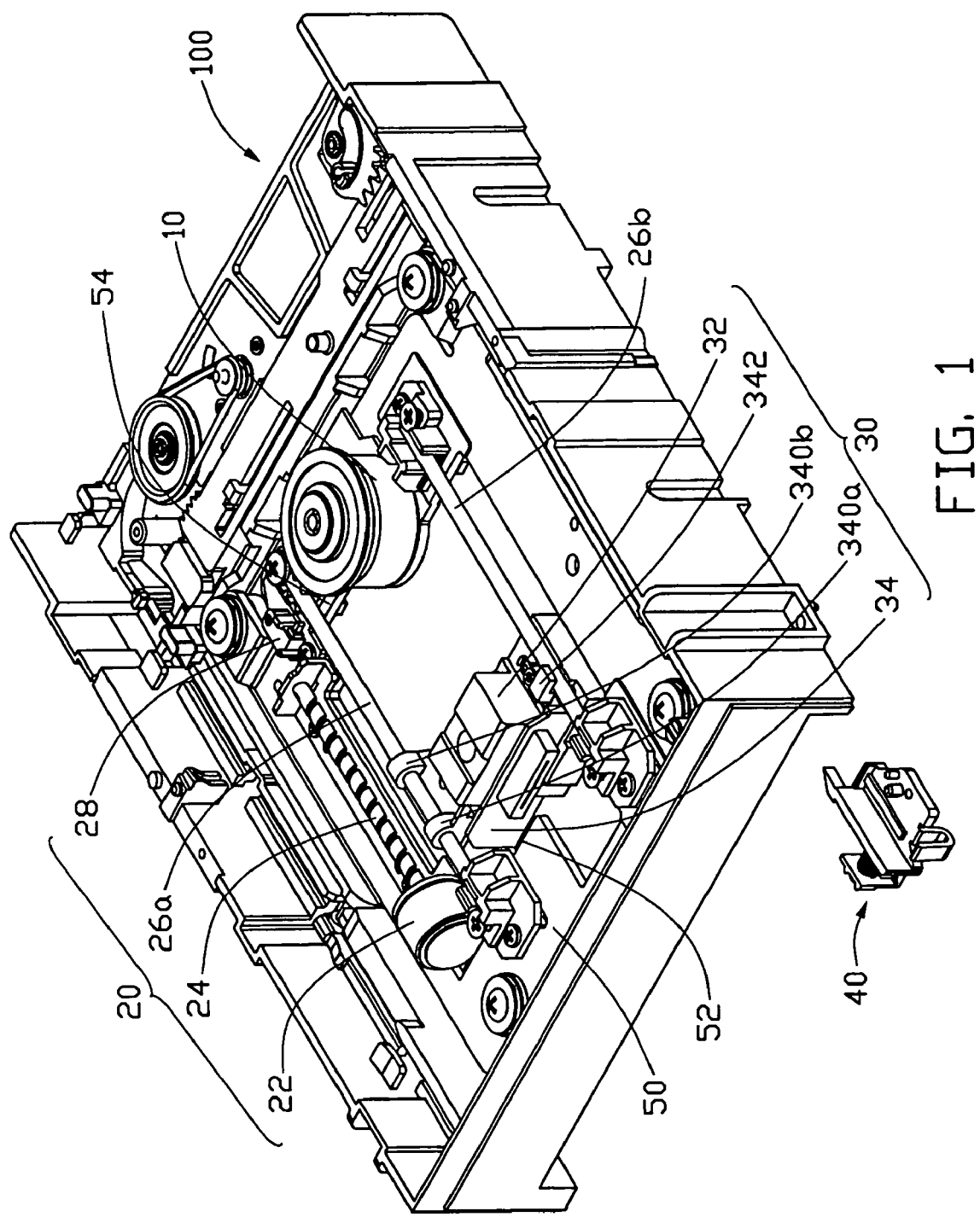
FIG. 1 is an exploded, isometric view of part of an information recording/reproducing apparatus and a transmitting device thereof, in accordance with the present invention.

Reference will now be made to the drawing figures to describe the preferred embodiment of the present invention in detail.

Figure 2:
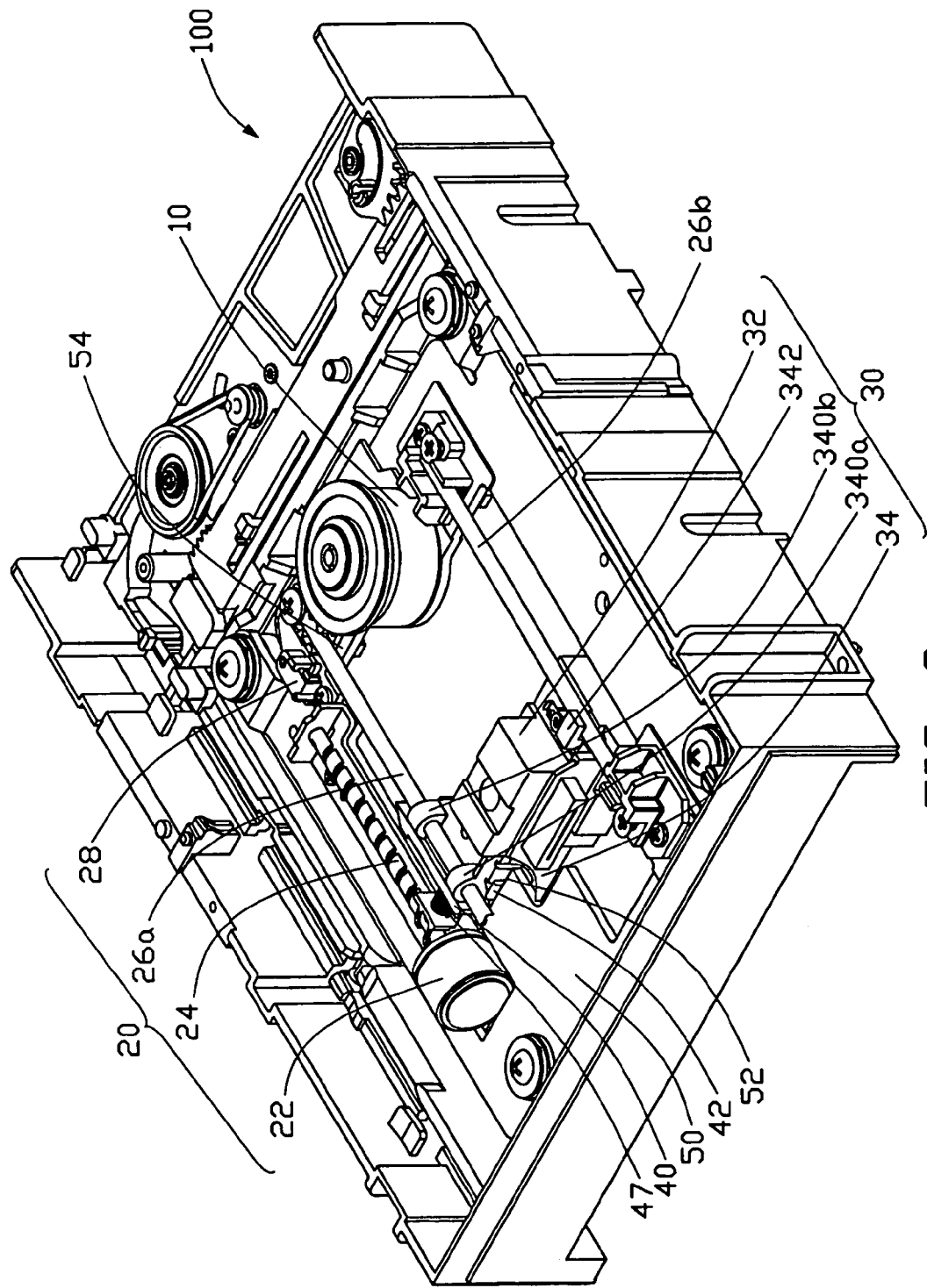
FIG. 2 is an assembled view of FIG. 1.

As shown in FIG. 1, an information recording/reproducing apparatus 100 in accordance with the present invention comprises a spindle motor 10 for rotating an optical disc, a driving module 20, a pickup module 30, a transmitting device 40, and a main chassis 50 for supporting and fixing the aforesaid components thereon. The pickup module 30 is driven by the driving module 20 via the transmitting device 40 (see FIG. 2).

The driving module 20 comprises a feeding motor 22 as a power provider, a driving shaft 24 for outputting power provided by the feeding motor 22, a pair of parallel guiding shafts 26a and 26b parallel to the driving shaft 24, and a restoration switch 28 located near an end of the guiding shaft 26a that is distal from the feeding motor 22.

The pickup module 30 comprises a pickup head 32 for recording/reproducing information to/from a disc, and a base 34 for supporting the pickup head 32 thereon. The base 34 further comprises a pair of guiding rings 340a, 340b movably holding the guiding shaft 26a therein, and a guiding portion 342 movably engaged with the guiding shaft 26b. The base 34 is movable along the guiding shafts 26a, 26b for tracking the disc.

Figure 3:
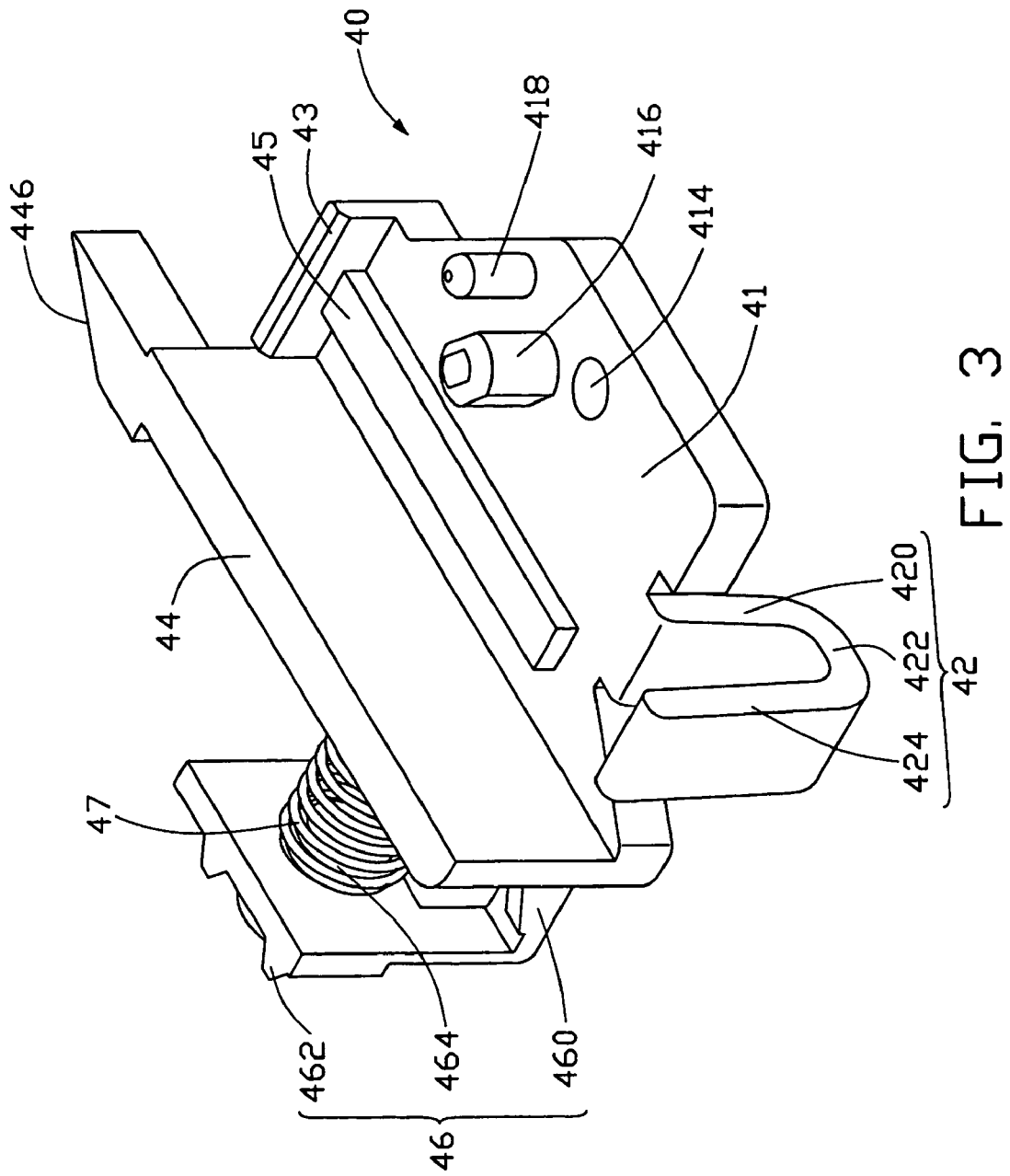
FIG. 3 is an enlarged, isometric view of the transmitting device of FIG. 1.
Figure 4:
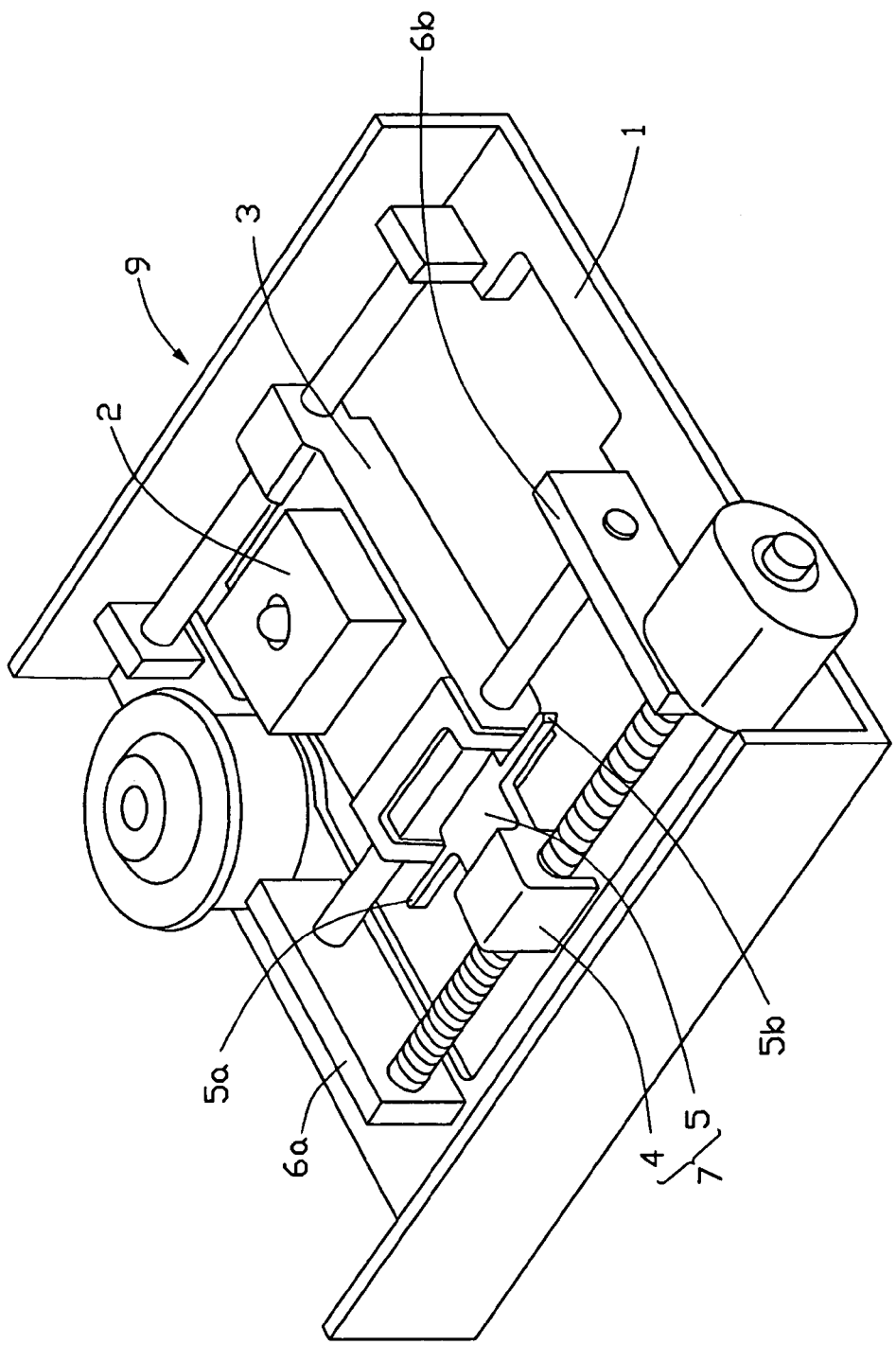
FIG. 4 is an isometric view of part of a conventional information recording and reproducing apparatus.

Now referring to FIG. 3, the transmitting device 40 comprises a fixing member 41, a U-shaped buffer member 42, a baffle 43, a side wall 44, a rib 45, an L-shaped engaging member 46, and a compression spring 47.

The fixing member 41 is a horizontal main body of the transmitting device 40, and comprises two set pins 416, 418 and a through hole 414. The set pins 416, 418 are engaged in two corresponding holes defined in the base 34 of the pickup module 30. A screw bolt is extended through the through hole 414 and engaged in the base 34, thereby fix the transmitting device 40 to the base 34.

The U-shaped buffer member 42 extends from a rear side of the fixing member 41, and comprises a first bending portion 420, a second bending portion 422, and a third bending portion 424. The first bending portion 420 extends downwardly from a rear edge of the fixing member 41. The third bending portion 424 is parallel to the first bending portion 420, and the second bending portion 422 interconnects the first bending portion 420 and the third bending portion 424.

The baffle 43 extends upwardly from a front side of the fixing member 41. The rib 45 is formed on the fixing member 41, and extends rearward from a middle of the baffle 43 almost to the rear edge of the fixing member 41.

The side wall 44 extends upwardly from a side edge of the fixing member 41. A wedged portion 446 extends forward from a front end of the side wall 44. A bevel of the wedged portion 446 is adapted to press the restoration switch 28. This changes the direction of movement of the pickup module 30, so as to prevent the pickup module 30 or the transmitting device 40 from bumping against a second inner edge 54 of the main chassis 50 (see FIGS. 1 and 2).

The L-shaped engaging member 46 comprises a rack 462, a boss 464, and a linking portion 460. The rack 462 is parallel to the side wall 44, and is engaged with the driving shaft 24 to transmit power to the pickup module 30. The boss 464 is formed on an inside of the rack 464. The linking portion 460 interconnects the rack 462 and the side wall 44. The compression spring 47 is engaged around the boss 464 and another boss formed at an outside of the side wall 44, and is compressed between the rack 462 and the side wall 44.

When the information recording/reproducing apparatus 100 is dropped or bumped, the pickup module 30 moves rapidly towards a first inner edge 52 of the main chassis 50. The U-shaped buffer member 42 comes into contact with the first inner edge 52 and deforms. As a result, the impact force is effectively dampened, and the pickup module 30 is protected from damage.

In alternative embodiments, the buffer member 42 may be V-shaped, or may have another suitable shape which dampens the force of its impact against the first inner edge 52.

Although the present invention has been described with reference to specific embodiments, it should be noted that the described embodiments are not necessarily exclusive, and that various changes and modifications may be made to the described embodiments without departing from the scope of the invention as defined by the appended claims.

What is claimed is:

1. A transmitting device for a feeding mechanism of an information recording/reproducing apparatus, comprising:
    an engaging member adapted to be engaged with a power source of the apparatus for power transmission;
    a fixing member adapted to be fixed to a pickup module of the apparatus;
    a buffer member adapted to dampen shock due to collision, the buffer member including at least two interconnecting portions which are deformable in a direction of movement of the pickup module; and
    a wedged portion opposite from the buffer member for triggering a restoration switch of the feeding mechanism.

2. The transmitting device as recited in claim 1, further comprising a baffle opposite from the buffer member.

3. The transmitting device as recited in claim 2, wherein a rib connected with the baffle is formed on the fixing member.

4. The transmitting device as recited in claim 3, wherein the buffer member is U-shaped.

5. The transmitting device as recited in claim 3, wherein the buffer member is V-shaped.

6. The transmitting device as recited in claim 1, wherein the buffer member is U-shaped.

7. The transmitting device as recited in claim 1, wherein the buffer member is V-shaped.

8. A feeding mechanism for an information recording/reproducing apparatus, comprising:
    a feeding motor; and
    a transmitting device for transmitting power from the feeding motor to a pickup module of the apparatus, the transmitting device including an engaging member drivably engaged with the feeding motor, a fixing member adapted to be fixed to the pickup module, a buffer member adapted to dampen shock due to collision, and a baffle opposite to the buffer member;
    wherein the buffer member comprises at least two interconnecting portions, which are deformable in a direction of movement of the pickup module.

9. The feeding mechanism as recited in claim 8, wherein the buffer member is U-shaped.

10. The feeding mechanism as recited in claim 8, wherein a rib connected with the baffle is formed on the transmitting device.

11. The feeding mechanism as recited in claim 8, wherein a wedged portion is provided on the transmitting device opposite to the buffer member, for triggering a restoration switch of the apparatus.

12. The feeding mechanism as recited in claim 8, wherein the buffer member is V-shaped.

13. An information recording/reproducing apparatus, comprising:
    a main chassis of said apparatus defining a space therein and an inner edge beside said space;
    an pickup module movably received in said space along a direction interferingly intersectable with said inner edge of said main chassis, and used for information recording/reproducing;
    an feeding mechanism powered to guidably move said pickup module in said space along said direction for said information recording/reproducing;
    a transmitting device engagable between said pickup module and said feeding mechanism for transmitting power of said feeding mechanism to said pickup module;
    a buffer member formed on said transmitting device and extending beside said pickup module toward said inner edge and adapted to reduce impact forces between said pickup module and said inner edge during movement of said pickup module; and
    a baffle formed on said transmitting device opposite to the buffer member.

14. The apparatus as recited in claim 13, wherein said buffer member is deformably U-shaped.

15. The apparatus as recited in claim 13, wherein a wedged portion is provided on said transmitting device opposite to said buffer member for triggering a restoration switch of said apparatus.

* * * * *